Feb. 6, 1962 — T. M. CURRY — 3,019,643
STRAIN GAUGE BALANCES
Filed Jan. 26, 1959 — 4 Sheets-Sheet 1
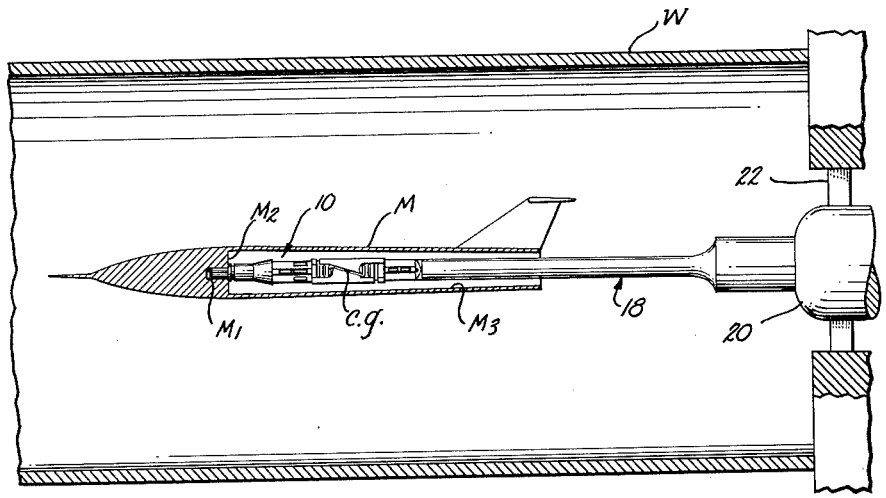
Fig. 3.
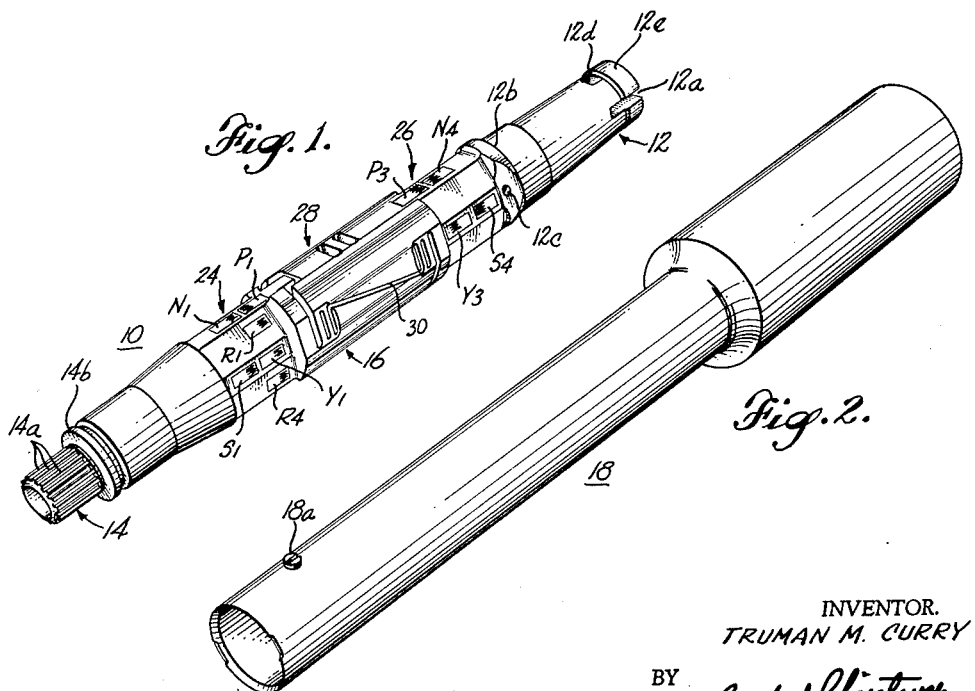
Fig. 1.
Fig. 2.
INVENTOR.
TRUMAN M. CURRY
BY
ATTORNEYS Feb. 6, 1962 T. M. CURRY 3,019,643
STRAIN GAUGE BALANCES
Filed Jan. 26, 1959 4 Sheets-Sheet 2

INVENTOR.
TRUMAN M. CURRY
BY
ATTORNEYS

Feb. 6, 1962     T. M. CURRY     3,019,643
STRAIN GAUGE BALANCES
Filed Jan. 26, 1959     4 Sheets-Sheet 3

INVENTOR.
TRUMAN M. CURRY
BY
ATTORNEYS

Feb. 6, 1962 T. M. CURRY 3,019,643
STRAIN GAUGE BALANCES
Filed Jan. 26, 1959 4 Sheets-Sheet 4
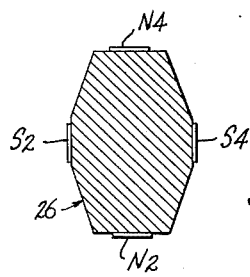
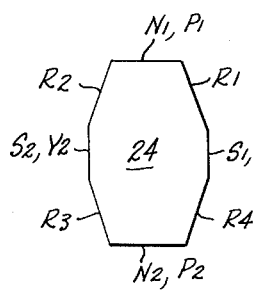
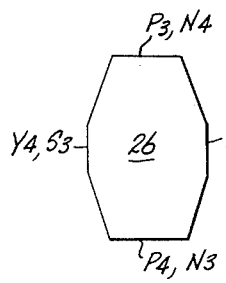
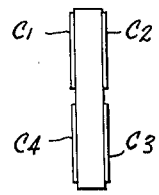
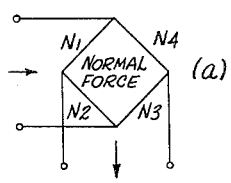
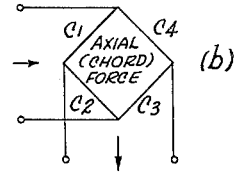
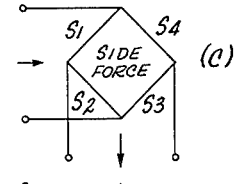
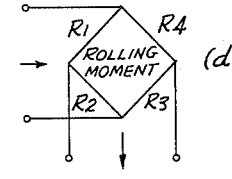
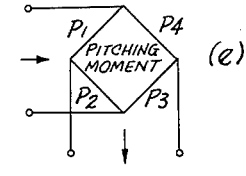
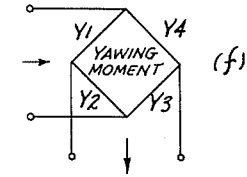
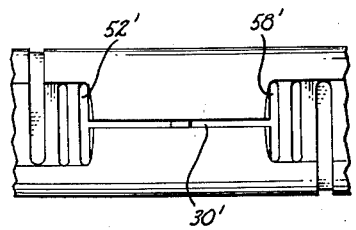
INVENTOR.
TRUMAN M. CURRY
BY
ATTORNEYS

United States Patent Office 3,019,643
Patented Feb. 6, 1962

3,019,643
STRAIN GAUGE BALANCES
Truman M. Curry, Bellevue, Wash., assignor to Boeing Airplane Company, Seattle, Wash., a corporation of Delaware
Filed Jan. 26, 1959, Ser. No. 789,059
11 Claims. (Cl. 73—147)

This invention relates to improvements in devices for measuring the component forces and moments acting on wind tunnel test models and the like, and more particularly concerns a new and improved strain gauge balance or sting. The invention is herein illustratively described by reference to the presently preferred form thereof; however, it will be recognized that certain modifications and changes therein with respect to details may be made without departing from the essential features involved. The balance herein disclosed has certain features of form generally similar to those found in that embodied in application Serial No. 547,500, filed November 17, 1955, of Gelbach and Owen, now issued as Patent No. 2,909,061.

Strain gauge balances are used to measure aerodynamic loads on models during tests in wind tunnels or under actual flight conditions. Tare loads are kept low by use of a multicomponent balance which projects from its support forwardly, i.e., against the airstream, and which is small enough to fit into a suitable model cavity which opens through the after end of the model. Resultant moments and forces acting on a model may be completely defined or resolved by breaking them into three components of force and three components of moment. This is done by the strain gauge balance wherein the respective components produce measurable strains in different members of the balance. These members carry strain gauges which are connected in combinations of series and parallel configurations to form Wheatstone bridge circuits. By appropriately connecting the strain gauges, the resulting bridge circuit unbalances caused by model loading correspond respectively to the normal, side and axial forces and the pitching, rolling and yawing moments of the model. The system thus measures six components.

Prior types of strain gauge balances, while usable within the requirements of relatively low-speed flight tests, are generally unsatisfactory under the more stringent requirements in testing models for high-speed jet engine and rocket engine propelled flight. Those closely familiar with wind tunnel test equipment have recognized the need for better balances and there have been various design proposals to that end. However, most, if not all, of the proposed and prior designs, if made small enough in cross section to fit into the available space within the slim cavity of a super-high-speed test model, lacked the necessary structural capacity to carry the loads, measured and otherwise, and to stand up long under the extreme buffeting encountered in these tests. Further, they did not sufficiently isolate the individual component forces and component moments involved, in terms of resulting stresses in the balance members, so as to permit their independent measurement with the degree of accuracy necessary to satisfy the critical tolerances imposed by flight at such high speeds. Other difficulties were also encountered such as excessive sensitivity to the wider temperature variation encountered in flight tests for jet and rocket aircraft and natural frequency characteristics in certain models which were within the range of frequency components caused by the pronounced flutter or other aerodynamic vibrational effects encountered in these tests, thereby adversely affecting the accuracy of the strain gauge bridge circuit readings obtained.

A broad object of the present invention is to provide an improved strain gauge balance overcoming the above-described difficulties and deficiencies of prior balances in the respects mentioned, and generally to provide a strain gauge balance which will be more effective and reliable in conducting high speed wind tunnel tests than prior balances.

More specifically, it is an object hereof to provide a strain gauge balance construction which is more efficient than heretofore in its separation of the force and moment component stresses developed in the gauge members thereby to permit making the desired measurements with accuracy unimpaired by interaction effects.

A further object is to provide a balance which is highly sensitive to the loads being measured yet has sufficient stiffness and strength to support a model against the heavy forces to which it is subjected. This has proven to be a particularly difficult requirement in the case of axial load measurement inasmuch as the element or member in the gauge which measures axial load must be so designed and arranged as to support or carry other loads and moments without permitting its functioning in these latter capacities to impair the accuracy of its primary measuring function. In this regard the improved balance comprises an axial force measuring member or flexure and associated gauges so arranged in relation to other stress measuring members in the gauge that, not only are the bending moments a minimum to which it is subjected, but any stresses to which it is subjected due to forces and moments acting in one plane do not combine directly with those from forces and moments acting in any orthogonal plane, insofar as they affect the axial strain gauge readings.

Still other objects are to provide an improved strain gauge balance construction which overcomes the problem of random or unpredictable errors heretofore arising because of hysteresis, nonlinearity of response, zero reading shifts or calibrational changes, due particularly to the existence of joints in the fabrication of separately preformed components in prior balances. It was found in connection with former types of strain gauge balances, that no matter how carefully the joints were formed, whether by means of bolts, dowels, brazing, welding or other types of joints, some of these unpredictable errors were likely to develop due to joint imperfections and consequent relative motion, however slight, occurring between joined parts. Moreover, such joints were subject to progressive failure under the extreme and prolonged buffeting encountered in testing models during the exhaustive tests performed on them. Ruggedness, durability, freedom from mechanical failures or deterioration represent further objectives of the present invention. To attain these and the other objectives mentioned in a balance which is readily fabricated is a further important object hereof.

In brief terms, the novel strain gauge balance as herein illustrated and described comprises an elongated rod-like cantilever having a base and an opposite, model-supporting tip, with an intermediately situated gauge or instrument portion. This instrument portion is of integral one-piece construction machined or cast in a special configuration, preferably in the basic stock of the cantilever, and comprises three main sections. Two of these sections are the longitudinally spaced, octagonal, cylindrical beam sections carrying strain gauges which are so arranged thereon and interconnected electrically as to measure all three moment components as well as the normal and side force components. The third section, contiguously interconnecting the two beam sections, represents the axial force component gauging section. The axial force gauging section is formed by slitting or severing the basic stock through from side to side generally longitudinally of the cantilever, thence, at one end, transversely to an intermediate side, such as the top side of the stock, and, from the opposite end of the longitudinally formed slit, transversely to the opposite or bottom side of the stock. The severance between adjoining beam sections thus effected is substantially a complete severance except for transverse webs or bridging elements which are retained as beam-like flexures which maintain the physical relationship of the otherwise severed portions of the stock, yet permit limited relative longitudinal displacement thereof under axial loads. Certain of these flexures are situated respectively at the ends of the generally longitudinally slit portion, and in these locations serve only as structural or load transmitting elements. One additional flexure is provided, however, which is located substantially in the geometric center, i.e. longitudinally between the end flexures and transversely of the balance, and which carries in closely spaced relationship a set of strain gauges arranged to measure axial force component. This axial force gauging flexure is preferably made stiff in relation to the structural flexures for a particular purpose to be described hereinafter. Its sides, which face endwise of the cantilever and which define its thickness, are formed by transversely slotting the base stock through from top to bottom in generally parallel planes perpendicular to the longitudinal axis of the cantilever. Its lateral sides or edges are defined, as is its effective length as a flexure or beam, by longitudinally formed slots which extend in parallel relationship between the two last-mentioned slots and which have a transverse span, extending at right angles to the cantilever axis outwardly from the axial midplane of the balance. The central, gauging flexure is so formed and located that a large portion of the total axial load is transmitted by it thus permitting delicate sensing of a relatively light force whereas, because of its stiffness in relation to the load transmitting flexures, the moment components and lateral force components transmitted by all the flexures have negligible effect on the axial force measurement.

These and other features, objects and advantages of the invention will become more fully evident from the following description thereof by reference to the accompanying drawings.

FIGURE 1 is a perspective view of the strain gauge balance.

FIGURE 2 is a perspective view of a base support for the balance.

FIGURE 3 is a longitudinal sectional view at reduced scale illustrating a typical installation of the balance supporting a wind tunnel test model.

Figure 7:
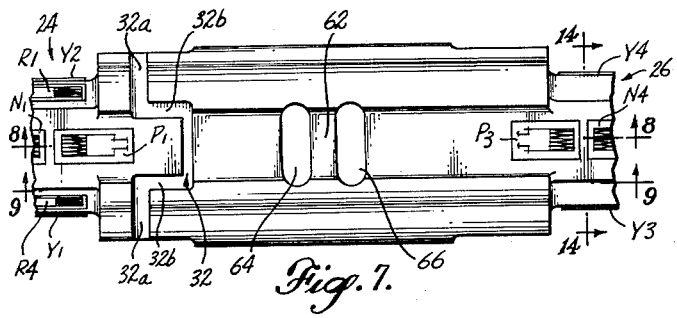
FIGURE 7 is a top view illustrating the portion shown in FIGURE 6.
Figure 11:
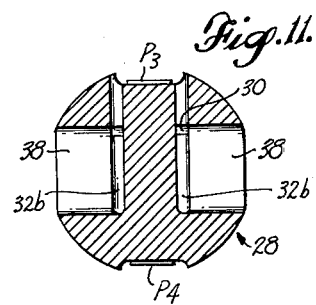
FIGURE 11 is a cross section taken on line 11—11 in FIGURE 6.
Figure 8:
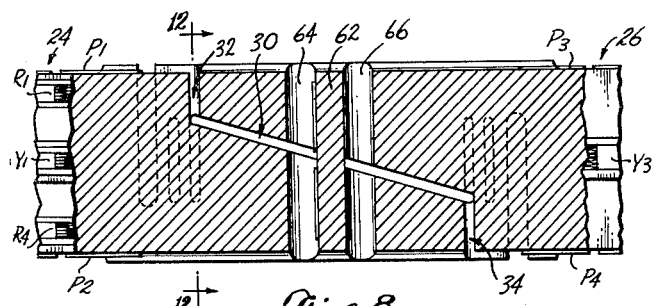
FIGURE 8 is a longitudinal sectional view taken on line 8—8 in FIGURE 7.
Figure 12:
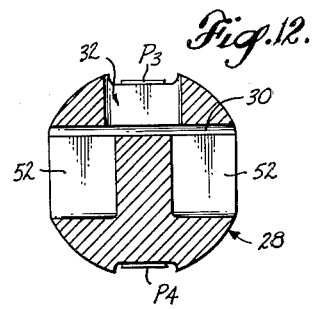
FIGURE 12 is a cross section taken on line 12—12 in FIGURE 8.
Figure 9:
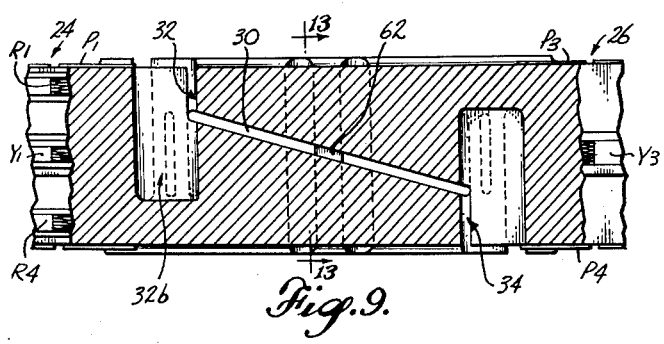
FIGURE 9 is a longitudinal sectional view taken on line 9—9 in FIGURE 7.
Figure 13:
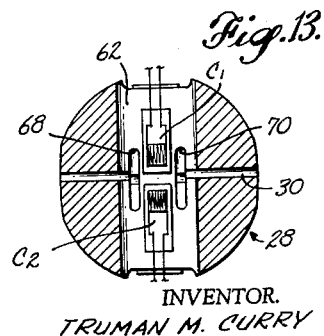
FIGURE 13 is a cross section taken on line 13—13 in FIGURE 9.

FIGURE 14 is a transverse section through the beam section 26 taken on line 14—14 in FIGURE 7, beam section 24 being similar in cross section.

FIGURE 15 is a diagram showing location of strain gauges on the surfaces of octagonal beam section 24.

FIGURE 16 is a diagram showing location of strain gauges on the surfaces of octagonal beam section 26.

FIGURE 17 is a diagram showing location of strain gauges on the surfaces of measuring flexure 62.

FIGURE 18 is a series of Wheatstone bridge diagrams illustrating the appropriate interconnections of the strain gauges to produce the desired signals representative of the several components being measured.

FIGURE 19 is a simplified side view illustrating a modified slotting arrangement in the axial force gauging section of the instrument portion.

Referring to the drawings, the strain gauge balance 10 generally comprises an elongated rod-like cantilever having a base 12 and a model-supporting tip 14, with an intermediately situated instrument portion 16. In a typical installation as shown in FIGURE 3 a model M is positioned in a wind tunnel duct W by means of the strain gauge balance 10 and a supporting rod or cantilever 18 aligned therewith in a generally horizontal position projecting directly upstream in the wind tunnel. The mounting base 18 is suitably supported by a hub 20 carried by radial vanes or struts 22 spaced apart to permit passage of air. The model M has a socket M1 situated therein forwardly of its center of gravity suitably engaged by the model-supporting tip 14 such that all three components of moment and all three components of force, into which the resulting moment and resulting force acting on the model at any time may be resolved, will be transmitted to the instrument portion 16 of the balance. In this case the model-supporting tip 14 is formed with American standard involute serrations 14a which have a class "B" fit with similarly formed serrations in the socket M1. A flange or shoulder 14b acts as a stop engaging the end wall M2 in the body cavity of the model to define the relative position of the instrument portion 16 with relation to the center of gravity or desired moment reference point of the model, preferably such that the geometric center of the instrument portion is coincident with the center of gravity of such model. This point is designated C.G. in FIGURE 3.

The cantilever base 12 has a keying slot 12a which antirotationally engages a suitable key (not shown) within the hollow interior of the mounting base 18. An annular stop or shoulder 12b limits penetration of the base in the interior of the tubular support 18 and is provided with apertures 12c on opposite sides thereof which extend through this annular shoulder in order to pass the wires which lead from the various strain gauges incorporated in the instrument portion 16, into a longitudinal central bore (not shown) within the base 12 through which they are led ultimately to exterior instrument panels associated with the apparatus. A recess 12d next to the end shoulder 12e serves as a socket for an obliquely oriented set screw 18a in the tubular wall of the support 18, holding the strain gauge balance in place on the support.

This general type of mounting arrangement for testing models in wind tunnels and under actual flight conditions is not new with the present invention. The present invention resides in the particular form, construction and arrangement of the instrument portion 16 in accordance with the objects and purposes set forth above.

From the illustration in FIGURE 3 it will be observed in the testing of a typical high speed aircraft model that the cavity cross section M3 within which the strain gauge balance must fit is quite small and that this imposes certain severe requirements on the construction of the instrument portion 16.

In accordance with one aspect of this invention, the instrument portion 16 is formed, preferably with the opposite end portions 12 and 14, from a single piece of basic stock such as a high grade of alloy steel subjected to a rigorous schedule of inspection and heat treatment in order to assure uniformity throughout and completely relieved stresses. In fact, with a unitary structure such as this, a greater degree of uniformity and relief of internal stresses within various portions of the balance are possible than with a balance put together from separately formed parts, thus reliable, uniform and predictable ultimate strength and fatigue endurance characteristics may be obtained consistent with the properties of SAE 4340 alloy, as well as possessing minimum random error and temperature effects.

A typical inspection and treatment procedure for the balance stock may include, before machining and preliminary heat treating, Magnaflux, macrotech and ultrasonic tests for uniformity. The Magnaflux test will be conducted also after the preliminary heat treatment, after the finish machining of the instrument portion but before the final heat treatment, and also after the final heat treatment. Rockwell hardness tests are also conducted after final heat treatment and, of course, the usual dimensional inspections after the final machining operation. Before the initial machining operation, the stock is normalized and tempered to 115–125 k.s.i. ultimate. After rough machining and before finish machining takes place, stresses are relieved at 1225° F. plus or minus 25° F. for approximately one hour. After the finish machining operations of the instrument portion 16, heat treatment of the stock is as follows: It is heated in a salt bath to approximately 1525° F. plus or minus 25° F. for approximately forty minutes. Thereafter it is quenched in an agitated salt bath at 500° F. plus or minus 25° F. for thirty seconds and is immediately removed from the quench bath and air cooled to 150° F. maximum. It is then tempered at 390° F. plus or minus 15° F. for four hours to RC 51–53. By following this process or an equivalent process, extremely accurate and reliable strain gauge balances are obtained which will be durable, relatively insensitive to temperature change, and possess minimum random error effects.

Referring now to the illustrated details of the instrument portion 16, it will be seen that this intermediate portion of the balance comprises three main sections. Two of these are represented in the longitudinally spaced octagonal beam sections 24 and 26 by which the three moment components and the two lateral force components are gauged, and the intermediately situated axial force gauging section 28 interconnecting such beam sections, yet permitting limited relative longitudinal displacement therebetween as a function of axial force acting on the model M. The octagonal beam sections which gauge forces and moments acting transversely to the balance centerline axis carry at certain locations thereon strain gauges which are electrically connected in bridge circuits for measurement purposes. Thus, rolling moment causes torsional strains in the beam sections 24 and 26 and is measured by locating strain gauges R1, R2, R3 and R4 (FIGURE 15) on the four opposing inclined surfaces of the beam section 24, i.e. that nearest the tip 14, and connecting these strain gauge resistance elements in a bridge circuit in the manner shown in FIGURE 18d.

Normal force, pitching moment, side force and yawing moment cause bending strains in the two octagonal beam sections 24 and 26. Normal force is measured by locating strain gauges N1 and N2 on respectively top and bottom sides of the forward beam section 24 and locating strain gauges N4 and N3 on respectively top and bottom sides of the beam section 26 and so connecting these strain gauges in a common bridge circuit as shown in FIGURE 18a as to measure the difference of the vertical bending moments in the two beam sections, as a measure of the applied normal force.

Pitching moment is measured by locating strain gauges P1 and P2 on respectively top and bottom surfaces of beam section 24 and strain gauges P3 and P4 on respectively top and bottom surfaces of beam section 26, and so connecting these strain gauges in a bridge circuit as shown in FIGURE 18e as to measure the sum of the vertical bending moments in the two beam sections, which represents the applied pitching moment about a point midway between the two beam sections, which is the point C.G. as shown in FIGURE 3.

Side force is measured by locating strain gauges S1 and S2 on respectively opposite lateral sides of the beam section 24 and strain gauges S3 and S4 on respectively opposite lateral sides of the beam section 26, and interconnecting these strain gauges in a bridge circuit as shown in FIGURE 18c so as to measure the difference between the horizontal bending moments in the two beam sections, which represents the applied side force.

Yawing moment is measured by locating strain gauges Y1 and Y2 on respectively opposite lateral sides of the beam section 24 and strain gauges Y3 and Y4 on respectively opposite lateral sides of beam section 26, and interconnecting these strain gauges so as to measure the sum of the horizontal bending moments in the two beam sections, which in turn represents the applied yawing moment about the point C.G.

The basic principles behind the mode of interconnecting the various strain gauges so as to measure the sums and the differences of bending moments in order to obtain the described resultant measurements is not novel with this invention. However, one important feature of the balance which is believed to be novel with this invention is the configuration involving the two longitudinally spaced octagonal beam sections 24 and 26 which carry the strain gauges described. They are made in this form, with the greatest thickness dimension in the plane of pitch, in order to prevent the maximum stresses due to side force and yawing moment from combining directly with the maximum stresses due to normal force and pitching moment. This octagonal configuration is equivalent to an elliptical configuration, of which it is an approximation adopted for ease of construction, the elliptical configuration actually being the more efficient for the mentioned purposes.

The axial force measuring section of the balance is formed in the basic stock immediately between the two beam sections 24 and 26 by machining a generally longitudinal slot 30 from side to side, extending over an appreciable portion of the length of the section 28, and extending the cut transversely by a slot 32 between one end of the slot 30 and the top side of the balance and by a slot 34 from the opposite end of the slot 30 and the bottom or opposite side of the balance. As illustrated, the slot 30 extends in a plane which is somewhat inclined to the axis of the balance for maximum strength although it will be evident from FIGURE 19 that the slotting may occur in the directly longitudinal sense if desired. The slots 32 and 34 are not straight or planar but have jogs or offset portions which, in the case of slot 32, are designated 32a offset from the basic slot 32 toward the tip end of the balance. These offset portions are joined to the main slot portion 32 by longitudinally extending portions 32b. In the case of the slot 34, the similarly offset portions 34a are joined to the main slot by longitudinally extending portions 34b. The offset portions 32a extend from the top side of the basic stock in this case to a depth which is approximately at the level with the lower extremity of the inclined slot 30 whereas the offset portion 34a extends to a depth from the bottom side of the stock to substantially the level of the upper end of the inclined slot 30. The structural end flexures of the axial force measuring section 28 are formed by additional slotting of the base stock inwardly from opposite sides thereof, in conjunction with the offset slot portions 32a and 34a. Sets of flexures 36, 38 are formed on both sides of the stock by cutting slots 50 and 52 parallel to the offset slot portion 32a successively at close spacing thereto along the length of the balance. Sets of flexures 54 and 56 are formed at the opposite end of the axial force section by the cutting of parallel slots 58 and 60 successively adjacent to the offset slot portion 34a. These structural flexures, of which there are a total of eight in the example, are preferably of uniform thickness and are thin in relation to the geometrically centered measuring flexure 62.

Figure 4:
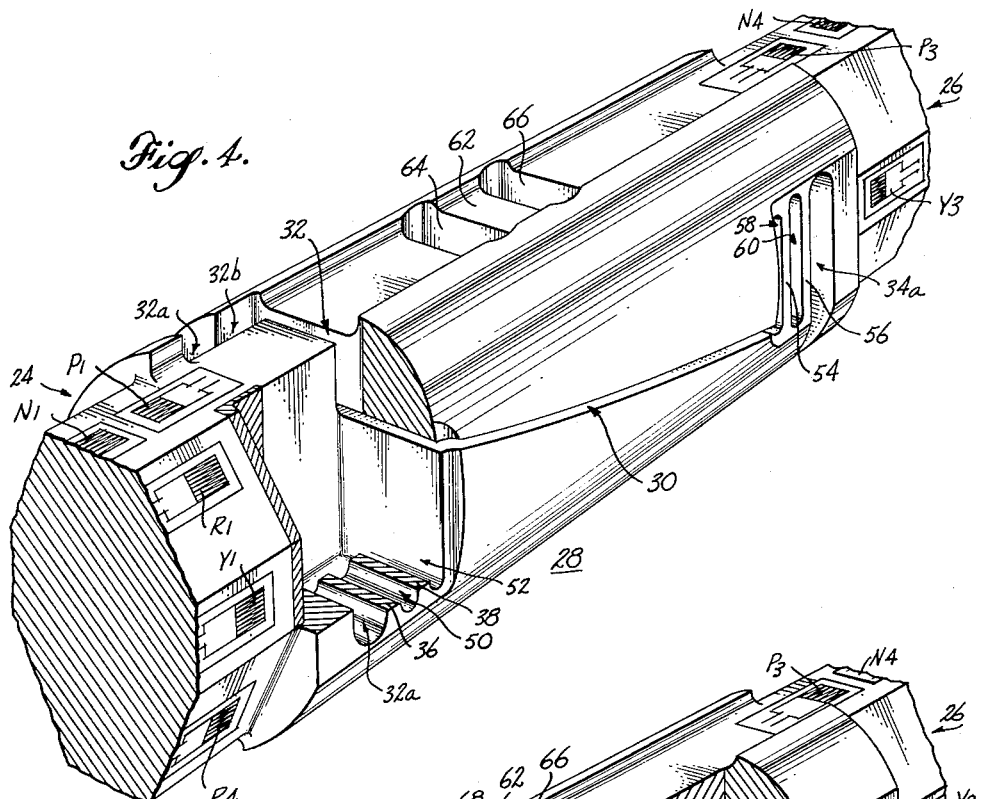
FIGURE 4 is a perspective view at a scale substantially larger than that of FIGURE 1, illustrating the instrument portion of the balance, with parts broken away to show details of construction.
Figure 5:
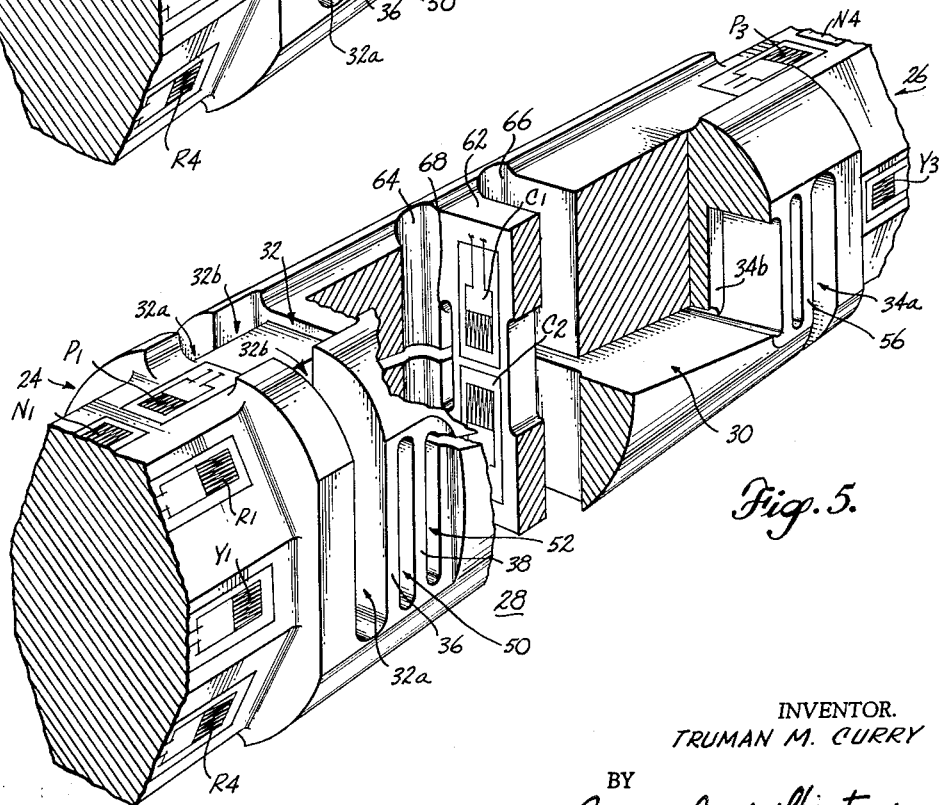
FIGURE 5 is a view similar to FIGURE 4 with different parts broken away to show still other details.
Figure 6:
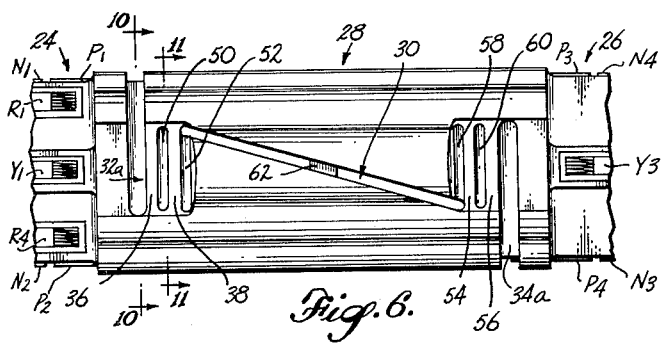
FIGURE 6 is a fragmentary side view of the instrument portion of the balance at a scale intermediate that used in FIGURES 1 and 4.
Figure 10:
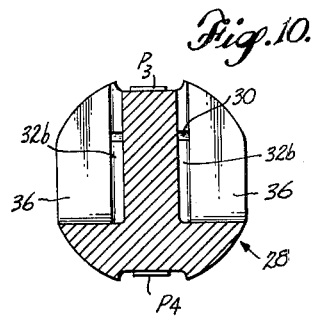
FIGURE 10 is a cross section taken on line 10—10 in FIGURE 6.

In order to form the gauging flexure 62, parallel transverse slots 64 and 66 are formed extending through the basic stock from top to bottom, leaving a web of material between them which is unsevered by the generally longitudinal slot 30. The flexure proper is formed from this web of material by slots 68 and 70 (FIGURE 5) which extend between the slots 64 and 66 and have a span measured transversely of the balance, i.e. in the direction from top to bottom, corresponding to the desired length of the flexure, and have a spacing corresponding to the desired width of the flexure. Strain gauges C1 and C2 are mounted close together on one side face of the flexure 62 as near as possible to the balance axis horizontally but at the outer extremity of the flexure 62 vertically, and a similar set of strain gauges C3 and C4 are mounted in like manner on the opposite side face. These strain gauges are connected together in a bridge circuit as in FIGURE 18b in order to measure strains due to bending moment in the flexure caused by axial model force, thereby to measure axial force itself. The measured strain provided by these strain gauges is a function of the portion of the total axial force which is carried by the measuring flexure which in turn is a function of the relative stiffness of the measuring flexure 62 and the combined stiffness of the eight structural flexures 36, 36, 38, 38, 54, 54, and 56, 56. Such measured strain is also a function of the strain sensitivity of the measuring flexure for a given load which in turn is a function of the section modulus, defined as the ratio of the flexure thickness as a beam to the section moment of inertia thereof.

By an analysis of the stresses due to drag or axial force assumed by the structural and measuring flexures, it can be shown that the accurate measurement of axial force component is attained by making the measuring flexure stiff in relation to the structural flexures, so that the measuring flexure absorbs a relatively high portion of the total axial force loading. A high degree of stiffness, as distinguished from strength, which may be an independently variable characteristic of the measuring flexure, is desirable because it provides a high natural frequency (i.e., above the normal range of flutter and aerodynamic vibrational frequencies encountered in most model tests) out of the desired range of response of the instrument, lower interactions between different gauging portions of the balance due to axial deflection, and a better separation of the stresses. In regard to the latter, the function of the structural flexures is to carry load components other than axial force loads. Since the stresses in a parallel rectangularly prismatic beam configuration, such as the flexures, are directly proportional to the beam thickness, the stresses in the structural flexures due to axial force are low in relation to that of the gauging flexure 62 because of their greater degree of flexibility. Finally, a high degree of stiffness of the measuring flexure 62 in relation to that of the structural flexures is desirable because of the greater independence it affords in the accuracy of measurements of axial force, free from the effects of structural discontinuities, hysteresis or deflections of the system due to temperature gradients. In other words, the measuring flexure is made as stiff as possible to axial loads being measured and as limber as possible to the loads which it must carry but to which its strain gauges should not respond. This may be seen by regarding the axial force section 28 as a system of parallel springs in which any deflectional disturbance on the end of limber springs such as the structural flexures has little effect on a relatively stiffer parallel spring such as the measuring flexure 62.

It will be observed that the geometrically centered location of the axial force measuring flexure 62 (i.e., centered at the point C.G.), midway between the beam sections 24, 26, with the surrounding axial force measuring portions of the balance symmetrically located about this center point causes the bending moments due to the components of force other than the axial force, which components it must support but not measure, to be a minimum. Thus, the characteristic weakness of the axial force measuring section 28 to bending moments makes possible provision of maximum load capacity for a given size (diameter) of the balance. Moreover, because the geometric center C.G. at which the flexure 62 is located is at the moment center and because the stress gauges may be located on this single beam or flexure in close proximity to each other and thereby to point C.G., it is possible to reduce the interaction errors due to other loads and also reduce the possibility of errors due to changes in temperature.

In FIGURE 19 the essential difference is the orientation of the longitudinal slot 30' parallel to the axis of the balance and the intersection of this slot at the median points of the slots 52' and 58', respectively, which cooperate with the other slots in defining the structural end flexures.

There is thus provided a compact, efficient, accurate, rugged and durable strain gauge balance suitable for ultra high speed flight model testing and adapted to practical one-piece construction to the ends and for the purposes described. It will be evident that various modifications and changes in details of configuration may be employed within the scope of the principal or essential features involved.

I claim as my invention:

1. A strain gauge balance for aerodynamic model testing comprising an elongated cantilever having a base, an opposite, model-supporting tip, and an instrument portion, said instrument portion comprising longitudinally spaced elongated beam sections of substantially uniform, at least approximately elliptical cross section, with the maximum thickness of the beam sections being in the pitching plane of the model and the minimum thickness of the beam sections being in the yawing plane thereof, and an intermediately situated axial force-measuring section interconnecting the beam sections, sets of electrical strain gauges operatively mounted on selected opposing longitudinally extending faces of said beam sections, and electric circuit means interconnecting said strain gauges in combinations which measure moment components and lateral forces acting on the model, said approximately elliptical form of the beam sections preventing the maximum stresses due to side force and yawing moment from combining directly with the maximum stresses due to normal force and pitching moment.

2. The strain gauge balance defined in claim 1, wherein the approximately elliptical beam sections are octagonal, having flattened top, bottom, side and intermediate interconnecting surfaces upon selected ones of which the respective strain gauges are mounted.

3. The strain gauge balance defined in claim 1, wherein the axial force measuring section comprises an integral one-piece structure formed from elongated rod-like base stock and including separate body portions longitudinally overlapping and interconnected at respectively opposite ends by transversely extending web-like structural flexures, and interconnected at substantially the geometric center between said end flexures by a single transversely extending gauging flexure laterally centered in the axial force measuring section and materially narrower laterally than the thickness of said measuring section, and a set of axial force measuring strain gauges mounted on the endwise-facing surfaces of said gauging flexure.

4. The strain gauge balance defined in claim 3, wherein the gauging flexure is materially stiffer than the individual structural flexures in response to axial forces tending to produce relative longitudinal displacement between said body portions.

5. A strain gauge balance for aerodynamic model testing comprising an elongated cantilever having a base, an opposite, model-supporting tip, and an instrument portion, said instrument portion comprising longitudinally spaced beam sections and an intermediately situated axial force measuring section, sets of strain gauges mounted on the surfaces of said beam sections and electrically interconnected in combinations to measure moment components and lateral forces acting on the model, said axial force measuring section comprising an integral one-piece structure formed from elongated rod-like base stock and including separate body portions longitudinally overlapping and interconnected at respectively opposite ends by transversely extending web-like structural flexures, and interconnected at substantially the geometric center between said end flexures by a single transversely extending gauging flexure laterally centered in the axial force measuring section and materially narrower laterally than the thickness of said measuring section, and a set of axial force measuring strain gauges mounted on the endwise-facing surfaces of said gauging flexure.

6. The strain gauge balance defined in claim 5 wherein the gauging flexure is materially stiffer than the individual structure flexure in response to axial forces tending to produce relative longitudinal displacement between said body portions.

7. A strain gauge balance to support an aerodynamic test model, comprising an elongated cantilever normally horizontally disposed, including longitudinally spaced beam sections and an axial force measuring section interconnecting said beam sections, all of integral one-piece construction, said measuring section comprising body stock having a generally longitudinal and transversely medial slot extending laterally therethrough and, from the respectively opposite end portions of such slot, slots exiting transversely through top and bottom of said body stock, said slots partially severing said body stock into longitudinally overlapping portions, transverse slots formed parallel and closely adjacent to said first-mentioned transverse slots and forming therewith transverse web-like structural flexures interconnecting said overlapping portions, two parallel slots extending transversely from top to bottom of the stock at a laterally medial location and at a longitudinally centered location, two longitudinally extending slots interconnecting the latter two slots and having lateral spacing equally on either side of the central axis of the stock and equal transverse extent above and below such axis, thereby defining, in conjunction with said latter two slots, a web-like axial force gauging flexure geometrically centered between the structural flexures, and strain gauge elements mounted in closely spaced centered relationship on the faces of said gauging flexure and interconnected to measure axial force acting on the model.

8. The strain gauge balance defined in claim 7, wherein the gauging flexure is materially thicker and stiffer than the structural flexures to axially directed force tending to displace the overlapping body portions relatively in a longitudinal sense.

9. The strain gauge balance defined in claim 8, wherein the first-mentioned transversely extending slots include laterally medial portions offset longitudinally of the stock from the laterally outer portions of these slots, and interconnecting longitudinally extending portions, the transverse slots which in conjunction therewith define the structural flexures extending between the outer sides of the stock and said longitudinally extending slot portions, thereby to define laterally spaced structural flexures at both ends of the measuring section.

10. The strain gauge balance defined in claim 9, wherein the generally longitudinal slot extends at an incline to the stock axis and intersects the structural-flexure-defining slots located at respectively opposite end portions of the measuring section.

11. A strain gauge balance for aerodynamic model testing comprising an elongated cantilever having a base, an opposite model-supporting tip, and an intermediate instrument portion, said instrument portion comprising an axial force measuring section including body portions longitudinally overlapping and interconnected at respectively opposite ends by transversely extending web-like structural flexures, gauging flexure means interconnecting said overlapping body portions intermediate said structural flexures and having materially greater cross-section than the individual structural flexures rendering such gauging flexure means materially stiffer than the individual structural flexures in response to axial forces tending to produce relative longitudinal displacement between said body portions, and strain gauge means mounted on endwise-facing surfaces of said gauging flexure means.

References Cited in the file of this patent

UNITED STATES PATENTS

| 2,768,526 | Trimble et al. | Oct. 30, 1956 |
| 2,865,200 | Gieseler | Dec. 23, 1958 |
| 2,906,119 | Montgomery | Sept. 29, 1959 |
| 2,918,816 | Ormond | Dec. 29, 1959 |

OTHER REFERENCES

Publication: Agard Memorandum A G2MI (1952), page 26. (Copy in Division 36.)